United States Patent
Venuraju et al.

(10) Patent No.: US 12,450,638 B2
(45) Date of Patent: *Oct. 21, 2025

(54) SYSTEMS AND METHODS FOR PROVIDING AN ENHANCED ANALYTICAL ENGINE

(71) Applicant: Capital One Services, LLC, McLean, VA (US)

(72) Inventors: Mithra Kosur Venuraju, Frisco, TX (US); Amit Ramit Deshpande, McKinney, TX (US); Satish Chikkaveerappa, McKinney, TX (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/737,458

(22) Filed: Jun. 7, 2024

(65) Prior Publication Data

US 2024/0330997 A1 Oct. 3, 2024

Related U.S. Application Data

(63) Continuation of application No. 17/850,089, filed on Jun. 27, 2022, now Pat. No. 12,008,616, which is a
(Continued)

(51) Int. Cl.
*G06Q 30/00* (2023.01)
*G06Q 30/0601* (2023.01)
(Continued)

(52) U.S. Cl.
CPC ..... *G06Q 30/0611* (2013.01); *G06Q 30/0631* (2013.01); *G06Q 50/188* (2013.01); *G06Q 10/20* (2013.01); *G06Q 30/012* (2013.01)

(58) Field of Classification Search
CPC .......... G06Q 30/0611; G06Q 30/0631; G06Q 50/188; G06Q 10/20; G06Q 30/012
(Continued)

(56) References Cited

U.S. PATENT DOCUMENTS

| 6,282,517 B1 | 8/2001 | Wolfe et al. |
| 7,577,634 B2 | 8/2009 | Ryan et al. |

(Continued)

OTHER PUBLICATIONS

"The fussy Indian takes maximum number of test drives before buying a car," [Panache] Sengupta, Nandini. The Economic Times (New Delhi Sep. 28, 2017, Dialog #1943248627 3pgs. (Year: 2017).*

(Continued)

*Primary Examiner* — Robert M Pond
(74) *Attorney, Agent, or Firm* — TROUTMAN PEPPER LOCKE LLP; Christopher J. Forstner; John A. Morrissett

(57) ABSTRACT

An enhanced analytical engine system may perform the steps of providing optimized individual transaction recommendations. The system may receive a request comprising customer financial information, customer identification information, and vehicle identification information. The system may collect information associated with one or more vehicles within an inventory listing associated with one or more dealership systems. The system may then provide data representing information associated with the one or more vehicles within an inventory listing associated with the one or more dealership systems. The system may receive data indicating selection of a vehicle of interest. The system may determine a proposed offer package for the vehicle of interest comprising an associated overall price and at least one from among a warranty option, maintenance option, and service contract option based on the customer preferences information and historical transaction data. The system may provide the determined proposed offer package for presentation to the customer.

20 Claims, 5 Drawing Sheets

Related U.S. Application Data continuation of application No. 17/018,928, filed on Sep. 11, 2020, now Pat. No. 11,373,226, which is a continuation of application No. 16/168,255, filed on Oct. 23, 2018, now Pat. No. 10,776,840.

(51) Int. Cl.
*G06Q 50/18* (2012.01)
*G06Q 10/20* (2023.01)
*G06Q 30/012* (2023.01)

(58) Field of Classification Search
USPC .............................................. 705/26, 27, 80
See application file for complete search history.

(56) References Cited

U.S. PATENT DOCUMENTS

| | | |
|---|---|---|
| 9,020,843 B2 | 4/2015 | Taira et al. |
| 9,747,611 B2 | 8/2017 | Battista |
| 10,366,435 B2 | 7/2019 | Swinson |
| 2002/0178069 A1 | 11/2002 | Walker et al. |
| 2004/0133456 A1 | 7/2004 | Nagelvoort |
| 2007/0136162 A1 | 6/2007 | Thibodeau et al. |
| 2008/0154737 A1 | 6/2008 | Linkswiler |
| 2014/0279171 A1 | 9/2014 | Burgiss et al. |
| 2014/0279263 A1 | 9/2014 | Liu et al. |
| 2014/0279275 A1 | 9/2014 | Burgiss et al. |
| 2015/0119980 A1 | 4/2015 | Beith et al. |
| 2015/0120489 A1 | 4/2015 | Edelman |
| 2015/0310466 A1 | 10/2015 | LaCivita et al. |
| 2015/0317709 A1 | 11/2015 | Zimmerman et al. |
| 2015/0363865 A1 | 12/2015 | Ramanuja et al. |
| 2016/0098771 A1 | 4/2016 | Brockman et al. |
| 2016/0180358 A1 | 6/2016 | Battista |
| 2016/0225003 A1 | 8/2016 | Inman et al. |
| 2017/0178063 A1 | 6/2017 | Dhandapani et al. |
| 2017/0287043 A1 | 10/2017 | Swinson |
| 2020/0104898 A1 | 4/2020 | Cui et al. |

OTHER PUBLICATIONS

Sengupta, Nandini: "The fussy Indian takes maximum No. of test drives before buying a car [Panache]," The Economic Times [New Delhi] Sep. 28, 2017; Dialog #1943248627, 3pgs (Year: 2017).

* cited by examiner ns and methods for providing an enhanced analytical engine

CROSS-REFERENCE TO RELATED APPLICATIONS AND PRIORITY CLAIM

This application is a continuation of, and claims priority under 35 U.S.C. § 120 to, U.S. patent application Ser. No. 17/850,089, filed Jun. 27, 2022, which issues as U.S. Pat. No. 12,008,616 on Jun. 11, 2024, which is a continuation of U.S. patent application Ser. No. 17/018,928, now U.S. Pat. No. 11,373,226, filed Sep. 11, 2020, which is a continuation of U.S. patent application Ser. No. 16/168,255, now U.S. Pat. No. 10,776,840, filed Oct. 23, 2018, the entire contents and substances of each of which are fully incorporated herein by reference in their entireties as if fully set forth below.

FIELD

The presently disclosed subject matter relates generally to enhanced analytical engines and, more particularly, to systems and methods for providing enhance analytical engines for optimizing individual transaction recommendations.

BACKGROUND

Traditionally, purchasing or leasing a car from a dealer is an arduous process. A prospective customer must shop for a new vehicle often with limited details on what loan terms the customer will ultimately qualify for or what elements of an overall sales price are negotiable.

After a vehicle of interest is identified, the customer may visit a dealership or may visit an online retailer to view more details about a vehicle. When they do, they will inevitably be faced with a barrage of different numbers, which can make it very hard to ensure that they are getting the best value. Further, while most customers are aware that they could try and negotiate the overall price of a vehicle, few are aware of other factors, such as warranties, service contracts, etc. which have an effect on the value of any transaction.

Accordingly, there is a need for improved vehicle acquisition (e.g., purchase or lease) systems to provide prospective customers with insights concerning proposed/possible offer packages that may affect completion of a transaction. Embodiments of the present disclosure are directed to this and other considerations.

SUMMARY

Consistent with a disclosed embodiment, systems and methods for providing enhanced analytical engines for optimizing individual transaction recommendations are disclosed. The system may comprise one or more processors and a memory in communication with the processor(s) and storing instructions that, when executed by the processor(s), are configured to cause the system to perform operations consistent with disclosed embodiments.

Consistent with the disclosed embodiments, the system may include one or more memory devices storing instructions, and one or more processors configured to execute the instructions to perform steps of a method to facilitate targeted content delivery to users who have control over what data is shared with advertising entities.

According to some embodiments, there is provided a system that may optimize individual transaction recommendations. The system may receive a request from a customer device comprising customer financial information, customer identification information, and vehicle identification information. The system may then collect, from one or more dealership systems, information associated with one or more vehicles within an inventory listing associated with the one or more dealership systems. The system may provide, to the customer device, data representing information associated with the one or more vehicles within an inventory listing associated with the one or more dealership systems. The system may then receive, from the customer device, data indicating selection of a vehicle of interest among the one or more vehicles within the inventory listing. The system may determine a proposed offer package for the vehicle of interest comprising an associated overall price and at least one from among a warranty option, maintenance option, and service contract option based on the customer preferences information and historical transaction data. Further, the system may provide, to the customer device, the determined proposed offer package for presentation to the customer, wherein the determined proposed offer package comprises prospective pricing information corresponding to each of the at least one vehicle.

In some example embodiments, the system may further comprise instructions to cause the system to receive, from the one or more dealership systems, historical transaction data for vehicles sold at one or more dealerships associated with the one or more dealership systems, the historical transaction data comprising vehicle information, overall negotiated price including a warranty option, maintenance option, and service contract option.

According to some example embodiments, the system may further comprise instructions to cause the system to provide, to the dealership system, a suggested new warranty option, maintenance option, and service contract option based on the tracked historical promotion data.

In some embodiments, determining a proposed offer package may comprises tracking historical transaction data for vehicles sold by one or more dealerships associated with the one or more dealership systems, the historical transaction data comprising vehicle information, overall negotiated price, and included options; and determining, using machine learning and based on the tracked historical transaction data, the proposed offer package.

According to some embodiments of the present disclosure, the vehicle of interest may have an associated vehicle type, and determining the proposed offer package may further comprise tracking historical transaction data of at least the overall price, warranty option cost, maintenance option cost, and service contract cost for the associated vehicle type of the at least one vehicle and determining a suggested time window to provide the proposed offer package for the vehicle of interest based on the historical transaction data.

In some embodiments, the vehicle of interest may have an associated vehicle type, and determining the proposed offer package may further comprise tracking historical transaction data of at least an overall price, warranty option cost, maintenance option cost, and service contract cost for past sales of the associated vehicle type; and identifying a recommended dealership associated with a dealership system of the one or more dealership systems for presenting the proposed offer package.

In some example embodiments, the system may further be configured to receive, from the customer, a customer-input indication of acceptance of the determined proposed offer package, and, responsive to the acceptance, provide, to the dealership system, the warranty provider system, the maintenance provider system, and the service contract provider system, data indicating the customer's willingness to enter into a transaction based on the proposed offer package.

According to some embodiments, there is provided a system that may optimize individual transaction recommendations. The system may receive a request from a customer device comprising customer financial information, customer identification information, and vehicle identification information. The system may then collect, from one or more dealership systems, information associated with one or more vehicles within an inventory listing associated with the one or more dealership systems. The system may then aggregate, from a warranty provider system, one or more warranty options associated with the at least one vehicle contained in the inventory listing. The system may aggregate, from a maintenance provider system, one or more maintenance options associated with the at least one vehicle contained in the inventory listing. The system may then aggregate, from a service contract system, one or more service contract options associated with the at least one vehicle contained in the inventory listing. The system may then receive, from the customer device, data indicating selection of a vehicle of interest among the one or more vehicles within the inventory listing. The system may determine a proposed offer package for the vehicle of interest comprising an associated overall price and at least one from among a warranty option, maintenance option, and service contract option based on the customer preferences information and historical transaction data. Further, the system may provide, to the customer device, the determined proposed offer package for presentation to the customer, wherein the determined proposed offer package comprises prospective pricing information corresponding to each of the at least one vehicle.

In some embodiments, the dealership system, the warranty provider system, the maintenance provider system, and the service contract provider system may all be associated with a single entity.

According to some embodiments, the dealership system, the warranty provider system, the maintenance provider system, and the service contract provider system may each be associated with a respective entity.

In some example embodiments, determining a proposed offer package may further comprise tracking historical transaction data one or more associated vehicle types of at least one vehicle of past negotiations, the historical transaction data comprising overall price including a warranty option for the one or more associated vehicle types; and providing, to the customer device, a suggested warranty option from a warranty provider associated with the warranty provider system based on applying the tracked historical transaction data.

According to some example embodiments, determining a proposed offer package may further comprise tracking historical transaction data one or more associated vehicle types of at least one vehicle of past negotiations, the historical transaction data comprising overall price including a maintenance option for the one or more associated vehicle types; and providing, to the customer device, a suggested maintenance option from a maintenance option provider associated with the maintenance provider system based on the tracked historical transaction data.

In some example embodiments, determining a proposed offer package may further comprise tracking historical transaction data one or more associated vehicle types of at least one vehicle of past negotiations, the historical transaction data comprising overall price including a service contract option for the one or more associated vehicle types; and providing, to the customer device, a suggested service contract option from a service contract provider associated with service contract provider system based on the tracked historical promotion data.

According to some example embodiments, the system may be further configured to receive, from the customer, a customer-input indication of acceptance of the determined proposed offer package, and, responsive to the acceptance, provide, to the dealership system, the warranty provider system, the maintenance provider system, and the service contract provider system, data indicating the customer's willingness to enter into a transaction based on the proposed offer package.

In some embodiments, each of the at least one vehicle may have an associated vehicle type, and determining the proposed offer package may further comprise tracking historical transaction data of at least the overall price, warranty cost, maintenance cost, and service contract cost for the associated vehicle type of the at least one vehicle and determining a suggested time window to provide the proposed offer package for the at least one vehicle based on the historical transaction data.

According to some embodiments, each of the at least one vehicle may have an associated vehicle type, and determining the proposed offer package may further comprise tracking historical transaction data of at least the overall price, warranty cost, maintenance cost, and service contract cost for the associated vehicle type of the at least one vehicle and determining a suggested dealership associated with a dealership system to present the proposed offer package to for a vehicle with the same associated vehicle type as the vehicle of interest.

In some example embodiments, the vehicle with the same associated vehicle type as the vehicle of interest and the vehicle of interest may be different vehicles located at respective dealerships.

According to some example embodiments, the vehicle with the same associated vehicle type as the vehicle of interest and the vehicle of interest may be the same vehicle.

According to some embodiments, there is provided a method for optimizing individual transaction recommendations. The method may comprise receiving a request from a customer, the request comprising customer financial information, customer identification information, and vehicle identification information. The method may further comprise collecting information associated with one or more vehicles within an inventory listing associated with the one or more dealership systems. The method may further comprise providing, to the customer, data representing information associated with the one or more vehicles within an inventory listing associated with the one or more dealership systems. The method may further comprise receiving, from the customer, data indicating selection of a vehicle of interest among the one or more vehicles within the inventory listing. The method may comprise determining a proposed offer package for the vehicle of interest comprising an associated overall price and at least one from among a warranty option, maintenance option, and service contract option based on the customer preferences information and historical transaction data. The method may further comprise providing, to the customer, the determined proposed offer package for presentation to the customer, wherein the determined proposed offer package comprises prospective pricing information corresponding to each of the at least one vehicle.

According to some example embodiments, determining a proposed offer package may comprise tracking historical transaction data for vehicles sold by one or more dealerships associated with the one or more dealership systems, the historical transaction data comprising vehicle information, overall negotiated price, and included options; and determining, using machine learning and based on the tracked historical transaction data, the proposed offer package.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

The accompanying drawings, which are incorporated and constitute a part of this specification, illustrate various embodiments and aspects of the disclosed embodiments and, together with the description, serve to explain the principles of the disclosed embodiments. In the drawings.

DETAILED DESCRIPTION

Figure 1:
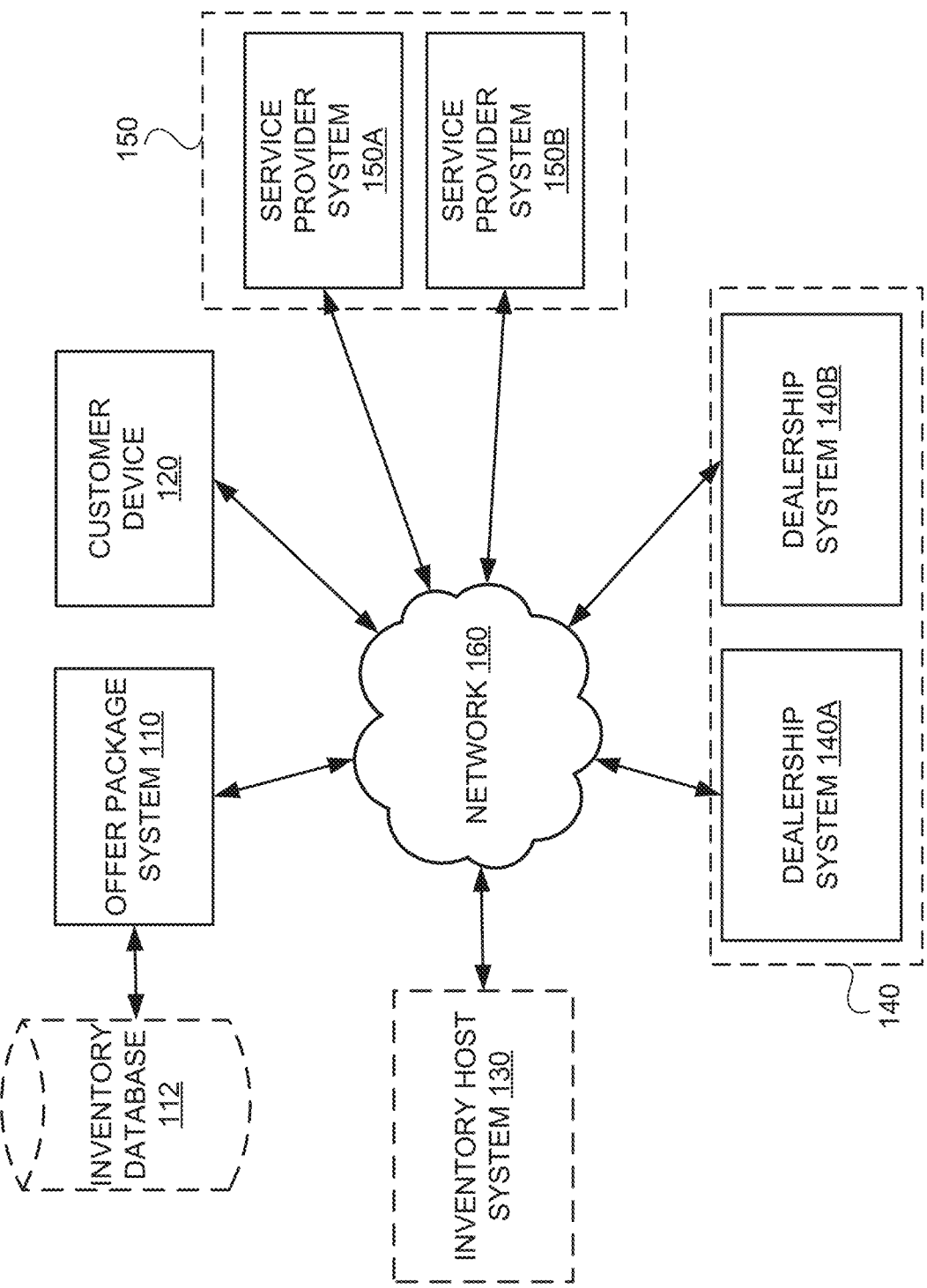
FIG. 1 illustrates an example enhanced analytical engine system consistent with disclosed embodiments.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Generally, the disclosed embodiments are directed to systems and methods for providing an enhanced analytical engine, more specifically, an enhanced analytical engine to provide personalized recommendations to assist car buyers with vehicle purchases.

In one aspect, a system for providing personalized offer packages to a prospective customer. Specifically, the system may include one or more memory devices storing instructions, and one or more processors configured to execute the instructions to perform the steps of a method. First, a customer may wish to acquire (e.g., purchase or lease) a vehicle. To get a sense of what types of vehicles are available and what the customer can afford, the customer may wish to access an inventory host website (e.g., hosted by the offer package system 110). The customer may already have some idea of what vehicle he/she wishes to purchase and may select either (i) specific vehicles (e.g., by a VIN) or (ii) a vehicle type(s). In response, the offer package system 110 may receive, from the customer device 120 (or any of the previously mentioned systems that may be configured to act as the inventory website host), an initial interest request. The initial interest request may include customer identification information (e.g., a full name, date of birth, social security number, etc.), customer financial information (e.g., income, debt information, etc.), and information associated with at least one vehicle contained within an inventory listing presented on the website.

The offer package system 110 may provide the customer with a personalized list of vehicles based on the information received in the initial request. In some cases, once the customer selects a vehicle of interest, the offer package system 110 may determine a proposed offer package. In other cases, the offer package system 110 may determine a proposed offer package for each vehicle in the personalized list of vehicles (e.g., a proposed price and options for each vehicle based on, for example, the vehicle dealer, location, mileage, and model). The determination may be made using a machine learning technique such as, for example, k-means clustering, naive bayes classifier, random forests, and other suitable machine learning techniques. For example, the offer package system 110 may make the determination based on reviewing historical transaction data for similar vehicles, for vehicles sold at a particular dealership, and for other factors that can be captured within automotive transaction data (e.g., MSRP, warranty, model, trim, year, and vehicle upgrades). The proposed offer package may include a suggested overall price and suggested options and tactics. For example, the proposed offer package may suggest offering $24,500 for a new Ford Escape and asking for a GAP warranty (i.e., suggested option) and a service contract (i.e., suggested option) to be included. In some example embodiments, the proposed offer package may suggest offering $20,500 for a new base model Ford Escape and may suggest a third-party service contract such as the addition of backup sensors or a backup camera (i.e., suggested options) to be included as part of the deal. It will be appreciated that such an offer package may reduce the overall price paid by a customer. As another example, the proposed offer package may suggest offering $22,000 for a new Ford Escape and may suggest a specific dealer (i.e., suggested tactic) and a specific time of the year/month/week/day (i.e., suggested tactic) to propose the offer. The offer package system 110 may then provide the proposed offer package to the customer. For example, the proposed offer may be delivered through email or may be provided to the customer via a website interface.

In some implementations, a customer may wish to acquire (e.g., purchase or lease) a vehicle. To determine the customer's price-range and vehicle options, the customer may wish to access an inventory host website (e.g., hosted by the offer package system 110) and as a result may submit an initial interest request. After receiving the request, offer package system 110 may aggregate vehicle and pricing data from dealership systems 140 as well as data from third party service providers that provide automotive services (e.g., warranty providers, aftermarket accessory providers, service contract providers, etc.). When determining the proposed offer package, offer package system 110 may use the aggregated data in combination with historical transaction data in order to develop the proposed offer package. The proposed offer package may indicate certain suggested options and tactics in order to get the best deal (e.g., a deal favorable to the customer that is also likely to be accepted) from an individual dealership. The proposed offer package may also indicate that certain suggested options should be purchased from different entities in order to attain the best value. For example, the proposed offer package may indicate a lower total cost to the customer could be obtained by purchasing the vehicle from a dealership (e.g., $22,000 for the new Ford Escape), but suggesting that the warranty and service contracts be purchased from a third party (as opposed to from the dealership). In another example, the customer may indicate that they would like a vehicle with a rear seat entertainment system. The proposed offer package may suggest that, in order to attain a lower total cost to the customer, the customer should purchase a vehicle from a dealership without a rear seat entertainment system and then purchase and install a rear seat entertainment system through a third party, such as an aftermarket retailer. The offer package system 110 may then provide the proposed offer to the customer. For example, the proposed offer may be delivered through email or may be provided to the customer via a website interface.

Reference will now be made in detail to example embodiments of the disclosed technology, examples of which are illustrated in the accompanying drawings and disclosed herein. Wherever convenient, the same references numbers will be used throughout the drawings to refer to the same or like parts.

FIG. 1 illustrates an example system 100 consistent with the disclosed embodiments. In one aspect, as shown, system 100 may include an offer package system 110, an inventory database 112, a customer device 120, an inventory host system 130, a dealership system 140, a service provider system 150, and a network 160. In some embodiments, the offer package system 110, which may operate in conjunction with an external inventory host system 130 or may host its own inventory listing (e.g., using the inventory database 112), may provide customized, offer package(s) to the customer device 120 via the network 160 and based on historical transaction data, customer preferences and vehicle information from the dealership system 140 and/or the service provider system 150. In other embodiments, the offer package system 110 may track customer preferences and track transaction history and, in turn, provide recommended promotions to one or more of the dealership system 140 and the service provider system 150 via the network.

The offer package system 110 may be configured to receive vehicle and customer information from a plurality of sources including customer device, 120, one or more of the dealership system 140, and the service provider system 150. In one aspect, the offer package system 110 may make a recommendation of a preferred offer package including various negotiation details and tactics. In some embodiments, the offer package system 110 may provide a proposed offer package including prospective financial information corresponding to each selected vehicle of the vehicle inventory. In other embodiments, the offer package system 110 may receive from the dealership system 140 customer financial information. The offer package system 110 may determine personalized financing information for the at least one vehicle based on the customer financial information and the determined promotion recommendation. Accordingly, the offer package system 110 may provide inventory items meeting the customer financial information and display personalized financing information including details such as loan term, loan interest rate, and the monthly payment. The offer package system 110 may include one or more components that perform processes consistent with the disclosed embodiments. For example, the offer package system 110 may include one or more physical or logical computer systems (e.g., servers, database systems, etc.) configured to execute software instructions programmed to perform aspects of the disclosed embodiments, such as processing information relating to the initial request that may be received from the customer device 120. Consistent with the disclosed embodiments, the offer package system 10 may be configured to provide, manage, monitor, and assess a prospective recommended combination of deal terms from one or more of the dealership system 140, the inventory host system 130, and the service provider system 150.

The inventory database 112 may be associated with the offer package system 110, and in some embodiments, the inventory database 112 may store inventory listings of all the vehicles available for purchase or lease on the system 100.

The customer device 120 may represent a system associated with an entity seeking to buy an item from another party. The customer device 120 may be configured to transmit and receive information associated with accessing a website, such as a website operated by the dealership system 140 or offer package system 110. The customer device 120 may include one or more components that perform processes consistent with the disclosed embodiments. For example, the customer device 120 may include one or more computers (e.g., servers, database systems, etc.) that are configured to execute software instructions programmed to perform aspects of the disclosed embodiments.

The inventory host system 130 may include one or more systems configured to receive, process, display, and transmit information associated with items for sale (e.g., automotive vehicles). In some embodiments, multiple dealership systems 140 (e.g., dealership systems 140A, 140B, etc.) may be configured to access a common inventory listing hosted by the inventory host system 130. The inventory host system 130 may be associated with the seller of the vehicles (e.g., a typical dealership) or with a third-party to the sale (e.g., Cars.Com™). The inventory host system 130 may include components that enable it to perform processes consistent with the disclosed embodiments. For example, the inventory host system 130 may provide websites that offer vehicle listings and communicate with the offer package system 110 or other components utilizing one or more APIs through network 160 to provide a suggested offer package for a vehicle included in an inventory listing stored on the inventory host system 130.

The dealership system 140 may include multiple separate dealership systems 140A, 140B, etc. (known collectively as the dealership system 140). The dealership system 140 may be configured to receive, process, display, and transmit information associated with items for sale (e.g., automotive vehicles). The dealership system 140 may be associated with the seller of the vehicles. The dealership system 140 may include components that enable it to perform processes consistent with the disclosed embodiments. For example, the dealership system 140 may provide websites that offer vehicle listings and communicate with the offer package system 110 or other components to provide a suggested offer package for a vehicle included in the vehicle listings.

The service provider system 150 may include multiple separate service provider systems 150A, 150B, etc. (known collectively as the service provider system 150). The service provider system 150 may be configured to receive, process, display, and transmit information associated with items for sale (e.g., automotive vehicles). The service provider system 150 may be associated with a third-party to the sale of the vehicles (e.g. Cars.Com™). The service provider system 150 may be associated with the sale of vehicle accessories, warranties, service contracts, or other items relating to automotive vehicles. The service provider system 150 may include components that enable it to perform processes consistent with the disclosed embodiments. For example, the service provider system 150 may provide websites that offer vehicle listings and communicate with the offer package system 110 or other components to provide a suggested offer package associated with those vehicle listings.

Facilitating communication between components of the system 100, the network 160 may be of any suitable type, including individual connections via the Internet such as cellular or WiFi networks. In some embodiments, the network 160 may connect terminals, services, and mobile devices using direct connections such as radio-frequency identification (RFID), near-field communication (NFC), Bluetooth™, low-energy Bluetooth™ (BLE), WiFi™, Ethernet, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
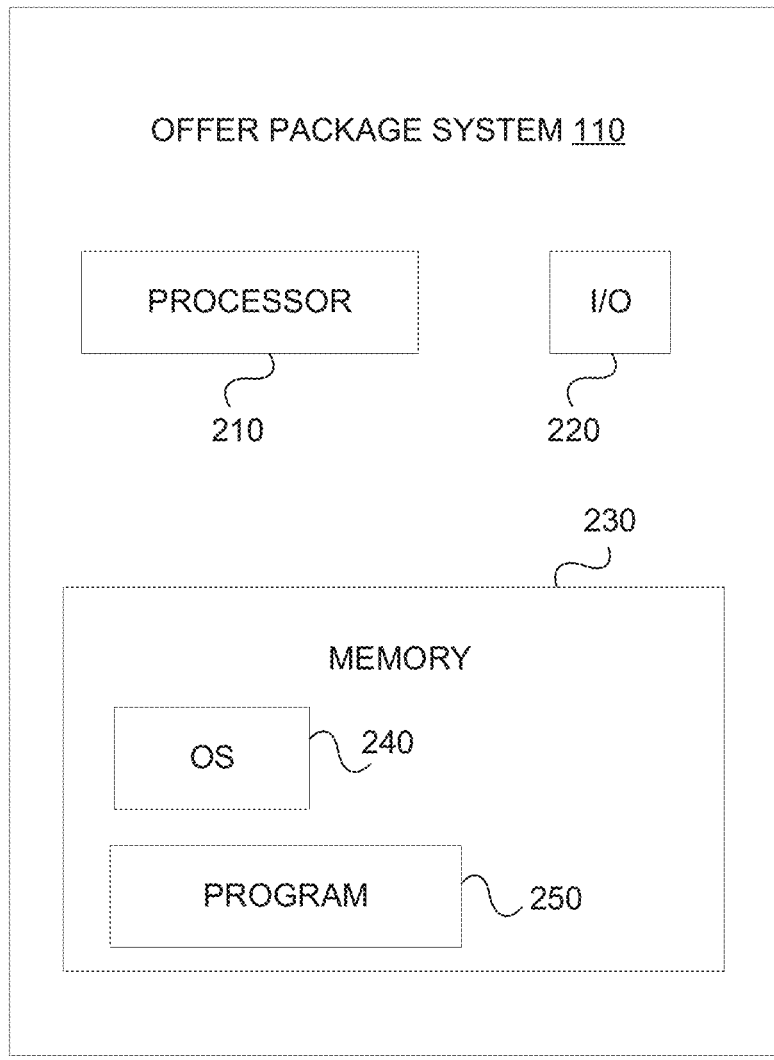
FIG. 2 is a component diagram of an example offer package system for use in the enhanced analytical engine system of FIG. 1.

Components of the offer package system 110 are shown in more detail in FIG. 2. The customer device 120, the inventory host system 130, the dealership system 140, and the service provider system 150 all may have a similar structure and components that are similar to those described with respect to the offer package aggregator system 110. As shown in FIG. 2, the offer package system 110 may include a processor 210, an input/output ("I/O") device 220, a memory 230 containing an operating system ("OS") 240 and a program 250. For example, the offer package system 110 may be a single server or may be configured as a distributed computer system including multiple servers or computers that interoperate to perform one or more of the processes and functionalities associated with the disclosed embodiments. In some embodiments, the offer package system 110 may further include a display (or a display interface), a peripheral interface, a transceiver, a mobile network interface in communication with the processor 210, a bus configured to facilitate communication between the various components of the offer package system 110, and a power source configured to power one or more components of the offer package system 110. A display may include any conventional display mechanism such as a flat panel display, projector, or any other display mechanism known to those having ordinary skill in the art. In some embodiments, a display, in conjunction with suitable stored instructions, may be used to implement a graphical user interface. In other embodiments, a display may include a display interface configured to receive or communicate with one or more external displays. The offer package system 110 may further include a sound interface, a camera interface, a telephony subsystem, an antenna interface, and a GPS receiver.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

In some embodiments, a transceiver may be configured to communicate with compatible devices and ID tags when they are within a predetermined range. A transceiver may be, for example, compatible with one or more of: radio-frequency identification (RFID), near-field communication (NFC), Bluetooth®, low-energy Bluetooth® (BLE), WiFi™, ZigBee®, ambient backscatter communications (ABC) protocols or similar technologies.

A mobile network interface may provide access to a cellular network, the Internet, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

The processor 210 may be one or more known processing devices, such as a microprocessor from the Pentium™ family manufactured by Intel™ or the Ryzen™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. In another embodiment, the processor 210 may include a multiple-core processor arrangement (e.g., dual or quad core) that is configured to provide parallel processing functionalities to allow the offer package system 110 to execute multiple processes simultaneously. One of ordinary skill in the art would understand that other types of processor arrangements could be implemented that provide for the capabilities disclosed herein.

The offer package system 110 may include one or more storage devices configured to store information used by processor 210 (or other components) to perform certain functions related to the disclosed embodiments. In one example, the offer package system 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the offer package system 110 includes memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, the offer package system 110 may include memory 230 that may include one or more programs 250 to perform one or more functions of the disclosed embodiments. Moreover, processor 210 may execute one or more programs 250 located remotely from the enhanced analytical engine system 100. For example, the system 100 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft SQL databases, SharePoint databases, Oracle™ databases, Sybase™ databases, or other relational databases. Memory 230 may include software components that, when executed by processor 210, perform one or more processes consistent with the disclosed embodiments.

The offer package system 110 may also be communicatively connected to one or more memory devices (e.g., databases (not shown)) locally or through a network (e.g., network 160). The remote memory devices may be configured to store information and may be accessed and/or managed by the offer package system 110. By way of example, the remote memory devices may be document management systems, Microsoft SQL database, SharePoint databases, Oracle™ databases, Sybase™ databases, or other relational databases. Systems and methods consistent with disclosed embodiments, however, are not limited to separate databases or even to the use of a database.

The offer package system 110 may also include one or more I/O devices 220 that may comprise one or more interfaces for receiving signals or input from devices and providing signals or output to one or more devices that allow data to be received and/or transmitted by the offer package system 110. For example, the offer package system 110 may include interface components, which may provide interfaces to one or more input devices, such as one or more keyboards, mouse devices, touch screens, track pads, trackballs, scroll wheels, digital cameras, microphones, sensors, and the like, that enable the offer package system 110 to receive data from one or more users. In other example embodiments, the I/O devices 220 may serve as the sound interface and/or the camera interface to present information to a user and capture information from a device's environment including instructions from the device's user. As additional examples, input components may include an accelerometer (e.g., for movement detection), a magnetometer, a digital camera, a microphone (e.g., for sound detection), an infrared sensor, an optical sensor, and a GPS receiver.

In example embodiments of the disclosed technology, the offer package system 110 may include any number of hardware and/or software applications that are executed to facilitate any of the operations. In example implementations, one or more I/O interfaces facilitate communication between the offer package system 110 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the offer package system 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the offer package system 110 may include a greater or lesser number of components than those illustrated.

Figure 3:
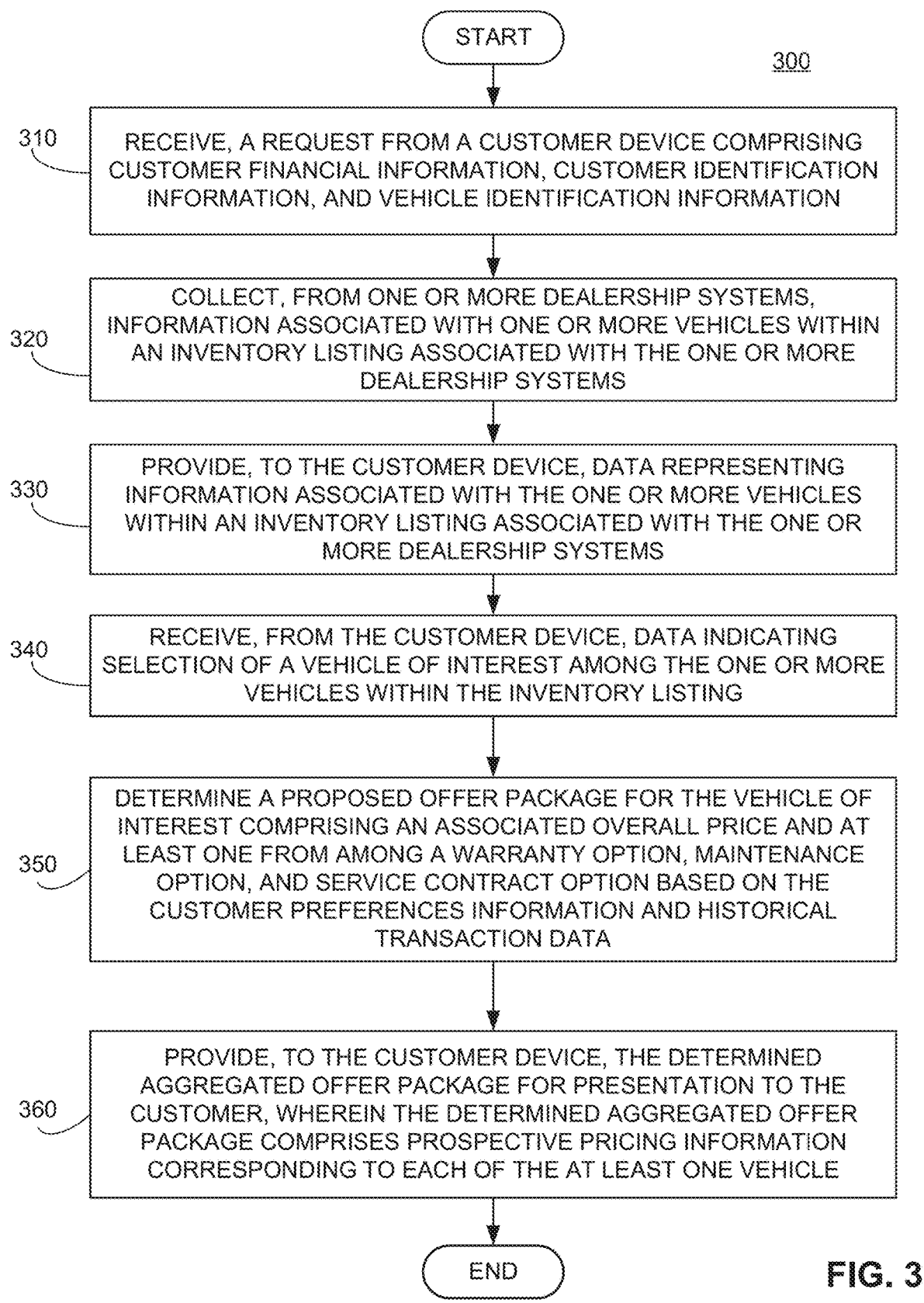
FIGS. 3-5 are flowcharts of example methods incorporating certain aspects of the present disclosure.

FIG. 3 shows a flowchart of an example method of using an offer package system 110, according to an example embodiment. In block 310, the system (e.g., offer package system 110) may receive, from a customer device, an initial request comprising customer financial information, customer identification information, and/or vehicle identification information. The customer financial information may include information relevant to a loan approval or to an inquiry into the amount of money a customer can afford to spend on a vehicle. For example, in some embodiments, customer financial information may include information related to the customer's income, the customer's debt(s), or other information regarding a customer's financial history or responsibilities. The customer identification information may include contact information and any information relevant for retrieving financial or other information about a customer that may be relevant to a vehicle transaction. For example, in some embodiments, customer identification information may include customer name, current customer mailing address, previous customer mailing address(es), customer phone number(s), customer social security number, date of birth, email address, a username and/or passcode authenticating the customer as the person he or she purports to be, etc. The vehicle identification information may include information relevant to a vehicle that a customer is considering purchasing. For example, vehicle identification information may include a type of vehicle (e.g., car, sports utility vehicle ("SUV"), truck, etc.), vehicle make, vehicle year, vehicle model, vehicle identification number ("VIN"), or information useful in identifying a vehicle or group of vehicles that are of interest to the customer.

In block 320, the system (e.g., offer package system 110) may collect and aggregate, from one or more dealerships systems, an inventory listing comprising information associated with one or more vehicles associated with the one or more dealership systems. The inventory listing may include a list of vehicles and corresponding vehicle information such as overall price, vehicle make, vehicle model, vehicle mileage, vehicle features, and other relevant information about vehicles that are for sale at dealerships associated with a dealership system 140. The inventory listings collected from different dealership systems may be aggregated and hosted by one of the offer package system 110 or the inventory host system 130. When the inventory listing is hosted by the offer package system 110, the inventory listing data may be stored on the inventory database 112, which may be directly connected to the offer package system 110.

In block 330, the system (e.g., offer package system 110) may provide, to the customer device 120, data representing one or more vehicles associated with the aggregated inventory listing. For example, in some embodiments, offer package system 110 may transmit data representing one or more vehicles associated with the aggregated inventory listing through network 160 to customer device 120 for display.

In block 340, the system (e.g., offer package system 110) may receive, from the customer device 120, data indicating a selection of a vehicle of interest from among the vehicles included in the aggregated inventory listing. For example, a customer may select an option in a mobile application or on a website running on customer device 120. The customer device 120 may then transmit data representing the customer's choice through network 160 to offer package system 110.

In block 350, the system (e.g., offer package system 110) may determine a proposed offer package for the vehicle of interest. The proposed offer package may include an associated overall price including at least one from among a warranty option, maintenance option, and service contract option based on the customer vehicle preference information and historical transaction data. In some embodiments, offer package system 110 may determine, based on the customer financial information and historical transaction data, an offer package that is likely to be accepted by a dealership. For example, in some embodiments, offer package system 110 may determine that a customer may be able to offer $1000 off the asking price if they also purchase a Guaranteed Asset Protection ("GAP") warranty. In another example embodiments, offer package system 110 may determine that a customer may be able to get a GAP warranty or other service contract included in the sale if they offer the full asking price. According to some embodiments, the system may determine the likelihood that an offer package is accepted by a dealer. For example, in some embodiments, offer package system 110 may determine that a first proposed offer has a 50% likelihood of success, while a second proposed offer has a 75% likelihood of success.

Further, in some embodiments, the offer package system 110 may receive customer financial information. The customer financial information may include a customer's credit history, loan history, employment information, and the like. In some embodiments, the system may be further configured to determine the proposed offer package based on preferred user financing preferences. For example, in some embodiments, the customer may value a lower monthly payment more so than a lower overall purchase price. The personalized financing information may include specific loan terms that the customer has been approved for as they apply to the vehicle of choice.

In block 360, the system (e.g., offer package system 110) may provide, to the customer device, the determined proposed offer package for presentation to the customer, wherein the determined proposed offer packaged comprises prospective pricing information corresponding to the vehicle of interest. For example, in some embodiments, offer package system 110 may transmit the determined proposed offer package through network 160 to customer device 120. Accordingly, a customer may be able to view a personalized proposed offer package as applied to the vehicle of interest.

Method 300 may also comprise embodiments where the system may determine proposed offer packages for the one or more vehicles associated with the aggregated inventory listing before providing the data representing the one or more vehicles associated with the aggregated inventory listing to the customer. For example, in some embodiments, offer package system 110 may determine, for each of the one or more vehicles associated with the aggregated inventory listing and based on the customer financial information and historical transaction data, an offer package that is likely to be accepted by a (respective) dealership for each of the one or more vehicles associated with the aggregated inventory listing. In such embodiments, offer package system 110 may then combine the data representing one or more vehicles associated with the aggregated inventory listing with the data representing offer packages for each vehicle. Offer package system 110 may then provide, to the customer device, the vehicle data with the offer package data for each of the one or more vehicles associated with the aggregated inventory listing.

Figure 4:
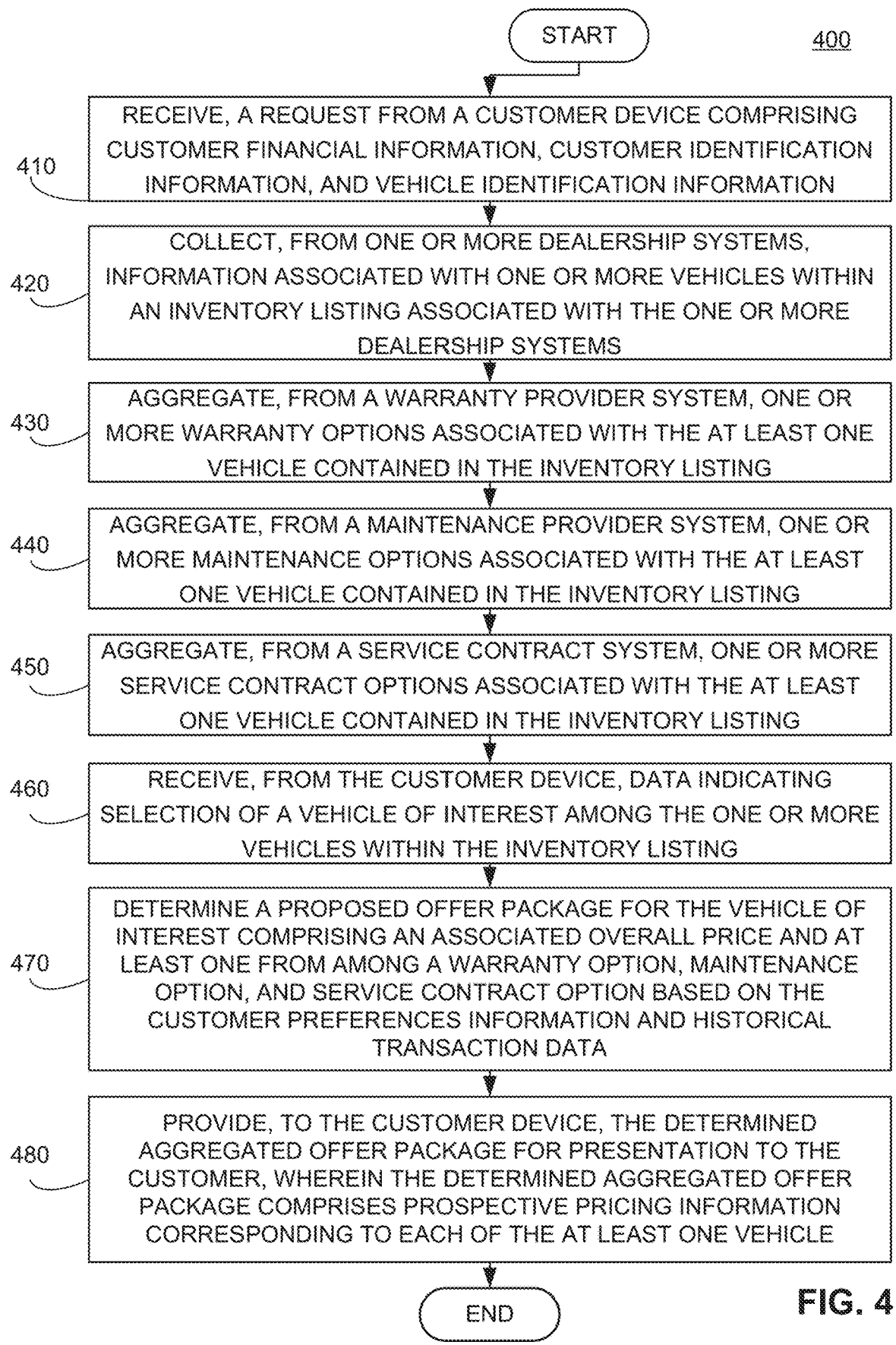

FIG. 4 shows a flowchart of an example method of using an offer package system 110, according to an example embodiment. In block 410, the system (e.g., offer package system 110) may receive, from a customer device, an initial request comprising customer financial information, customer identification information, and vehicle identification information. The customer financial information may include information relevant to loan approval or to an inquiry into the amount of money a customer can afford to spend on a vehicle. For example, in some embodiments, customer financial information may include information related to the customer's income, the customer's debt(s), or other information regarding a customer's financial history or responsibilities. The customer identification information may include contact information and any information relevant for retrieving financial or other information about a customer that may be relevant to a vehicle transaction. For example, in some embodiments, customer identification information may include customer name, current customer mailing address, previous customer mailing address(es), customer phone number, customer social security number, date of birth, email address, a username and/or passcode authenticating the customer as the person he or she purports to be, etc. The vehicle identification information may include information relevant to a vehicle that a customer is considering purchasing. For example, vehicle identification information may include a type of vehicle (e.g., car, sports utility vehicle ("SUV"), truck, etc.), vehicle make, vehicle year, vehicle model, vehicle identification number ("VIN"), or information useful in identifying a vehicle or group of vehicles that are of interest to the customer.

In block 420, the system (e.g., offer package system 110) may collect and aggregate, from one or more dealerships systems, an inventory listing comprising information associated with one or more vehicles associated with the one or more dealership systems. The inventory listing may include a list of vehicles and corresponding vehicle information such as overall price, vehicle make, vehicle model, vehicle mileage, vehicle features, and other relevant information about vehicles that are for sale at dealerships associated with a dealership system 140. The inventory listings collected from different dealership systems may be aggregated and hosted by one of the offer package system 110 or the inventory host system 130. When the inventory listing is hosted by the offer package system 110, the inventory listing data may be stored on the inventory database 112, which may be directly connected to the offer package system 110.

In block 430, system (e.g., offer package system 110) may aggregate from a warranty provider system, one or more warranty options associated with the one or more vehicles contained in the inventory listing. For example, according to some embodiments, offer package system 110 may request via network 160 information regarding types of warranties offered and specific warranty terms from service provider system 150.

In block 440, system (e.g., offer package system 110) may aggregate from a maintenance provider system, one or more maintenance options associated with the one or more vehicles contained in the inventory listing. For example, according to some embodiments, offer package system 110 may request via network 160 information regarding types of maintenance options offered and specific maintenance contract terms from service provider system 150.

In block 450, system (e.g., offer package system 110) may aggregate from a service contract system, one or more service contract options associated with the one or more vehicles contained in the inventory listing. For example, according to some embodiments, offer package system 110 may request via network 160 information regarding types of service contracts offered and specific service contract terms from service provider system 150.

In block 460, the system (e.g., offer package system 110) may receive, from the customer device, data indicating a selection of a vehicle of interest from among the vehicles included in the aggregated inventory listing. For example, a customer may select an option in a mobile application or on a website running on customer device 120. The customer device 120 may then transmit data representing the customer's choice through network 160 to offer package system 110.

In block 470, the system (e.g., offer package system 110) may determine a proposed offer package for the vehicle of interest, wherein the proposed offer package comprises an associated overall price including at least one from among a warranty option, maintenance option, and service contract option based on the customer vehicle preference information and historical transaction data. In some embodiments, offer package system 110 may determine, based on the customer financial information and historical transaction data, an offer package that is likely to be accepted by a dealership. For example, in some embodiments, offer package system 110 may determine that a customer may be able to offer $1000 off the asking price if they also include a Guaranteed Asset Protection ("GAP") warranty. In another example embodiments, offer package system 110 may determine that a customer may be able to get a GAP warranty or other service contract included in the sale if they offer the full asking price. According to some embodiments, the system may determine the likelihood that an offer package is accepted by a dealer. For example, in some embodiments, offer package system 110 may determine that a first proposed offer has a 50% likelihood of success, while a second proposed offer has a 75% likelihood of success.

In some embodiments, the system (e.g., offer package system 110) may be further configured to determine a suggested time window to purchase a vehicle type associated with a selected vehicle from the vehicle inventory (e.g., according to historical transaction data, the vehicle type of interest may sell for a lower average overall price if purchased between August and November). The offer package system 110 may also determine a suggested geographic location. For example, the offer package system 110 may be configured to provide, to the customer device 120, a recommendation suggesting a geographic area where the vehicle type of interest may be purchased at a deeper discount based on tracking of historical sales data in various areas and at various individual dealerships (e.g., hybrid vehicles, based on historical transaction data, sell for, on average, $3,000 less in the Southeast than in the Midwest, and therefore determining the southeast as the suggested geographic location to purchase a vehicle of that type).

Further, in some embodiments, the offer package system 110 may receive customer financial information. The customer financial information may include a customer's credit history, loan history, employment information, and the like. In some embodiments, the system may be further configured to determine the proposed offer package based on preferred user financing preferences. For example, in some embodiments, the customer may value a lower monthly payment more so than a lower overall purchase price. The personalized financing information may include specific loan terms that the customer has been approved for as they apply to the vehicle of choice.

In block 480, the system (e.g., offer package system 110) may provide, to the customer device, the determined proposed offer package for presentation to the customer, wherein the determined proposed offer packaged comprises prospective pricing information corresponding to the vehicle of interest. For example, in some embodiments, offer package system 110 may transmit the determined proposed offer package through network 160 to customer device 120. Accordingly, a customer may be able to view a personalized proposed offer package as applied to the vehicle of interest.

Method 400 may also comprise embodiments where the system determines proposed offer packages based on a customer risk profile (e.g., how comfortable a customer is with surprise costs) and/or a questionnaire. For example, offer package system 110 may determine based on received customer financial information and customer identification information an amount of financial risk that a customer is able to take on. For example, the offer package system 110 may consider a loan amount a customer has been prequalified for along with down payment availability. In some embodiments, offer package system 110 may present the customer with one- or more questions (e.g., a questionnaire) to fill out in order to gather more data relevant to the customer's ability to assume financial risk.

Figure 5:
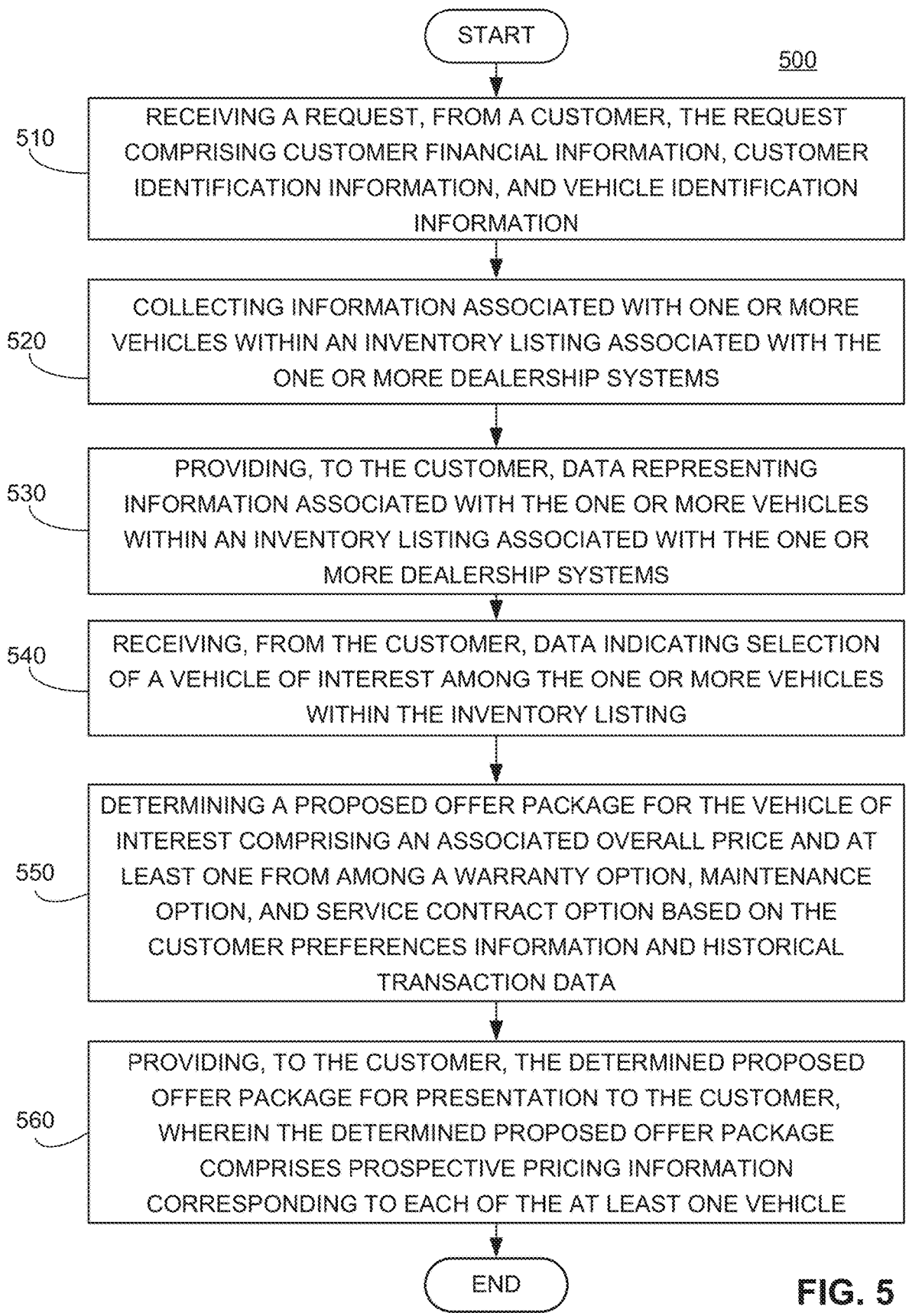

FIG. 5 shows a flowchart of an example method of using an offer package system 110, according to an example embodiment. In block 510, the method may involve receiving an initial request comprising customer financial information, customer identification information, and vehicle identification information. The customer financial information may include information relevant to loan approval or to an inquiry into the amount of money a customer can afford to spend on a vehicle. For example, in some embodiments, customer financial information may include information related to the customer's income, the customer's debt(s), or other information regarding a customer's financial history or responsibilities. The customer identification information may include contact information and any information relevant for retrieving financial or other information about a customer that may be relevant to a vehicle transaction. For example, in some embodiments, customer identification information may include customer name, current customer mailing address, previous customer mailing address(es), customer phone number, customer social security number, date of birth, email address, a username and/or passcode authenticating the customer as the person he or she purports to be, etc. The vehicle identification information may include information relevant to a vehicle that a customer is considering purchasing. For example, vehicle identification information may include a type of vehicle (e.g., car, sports utility vehicle ("SUV"), truck, etc.), vehicle make, vehicle year, vehicle model, vehicle identification number ("VIN"), or information useful in identifying a vehicle or group of vehicles that are of interest to the customer.

In block 520, the method may involve collecting and aggregating an inventory listing comprising information associated with one or more vehicles associated with the one or more dealership systems. The inventory listing may include a list of vehicles and corresponding vehicle information such as overall price, vehicle make, vehicle model, vehicle mileage, vehicle features, and other relevant information about vehicles that are for sale at dealerships associated with a dealership system 140. The inventory listings collected from different dealership systems may be aggregated and hosted by one of the offer package system 110 or the inventory host system 130. When the inventory listing is hosted by the offer package system 110, the inventory listing data may be stored on the inventory database 112, which may be directly connected to the offer package system 110.

In block 530, the method may involve providing data representing one or more vehicles associated with the aggregated inventory listing. For example, in some embodiments, offer package system 110 may transmit data representing one or more vehicles associated with the aggregated inventory listing through network 160 to customer device 120 for display.

In block 540, the method may involve receiving data indicating a selection of a vehicle of interest from among the vehicles included in the aggregated inventory listing. For example, a customer may select an option in a mobile application or on a website running on customer device 120. The customer device 120 may then transmit data representing the customer's choice through network 160 to offer package system 110.

In block 550, the method may involve determining a proposed offer package for the vehicle of interest, wherein the proposed offer package comprises an associated overall price including at least one from among a warranty option, maintenance option, and service contract option based on the customer vehicle preference information and historical transaction data. In some embodiments, offer package system 110 may determine, based on the customer financial information and historical transaction data, an offer package that is likely to be accepted by a dealership. For example, in some embodiments, offer package system 110 may determine that a customer may be able to offer $1000 off the asking price if they also include a Guaranteed Asset Protection ("GAP") warranty. In another example embodiments, offer package system 110 may determine that a customer may be able to get a GAP warranty or other service contract included in the sale if they offer the full asking price. According to some embodiments, the system may determine the likelihood that an offer package is accepted by a dealer. For example, in some embodiments, offer package system 110 may determine that a first proposed offer has a 50% likelihood of success, while a second proposed offer has a 75% likelihood of success.

Further, in some embodiments, the offer package system 110 may receive customer financial information. The customer financial information may include a customer's credit history, loan history, employment information, and the like. In some embodiments, the system may be further configured to determine the proposed offer package based on preferred user financing preferences. For example, in some embodiments, the customer may value a lower monthly payment more so than a lower overall purchase price. The personalized financing information may include specific loan terms that the customer has been approved for as they apply to the vehicle of choice.

In block 560, the method may involve providing the determined proposed offer package for presentation to the customer, wherein the determined proposed offer packaged comprises prospective pricing information corresponding to the vehicle of interest. For example, in some embodiments, offer package system 110 may transmit the determined proposed offer package through network 160 to customer device 120. Accordingly, a customer may be able to view a personalized proposed offer package as applied to the vehicle of interest.

Example Use Cases

The following example use cases describe examples of typical flow patterns. These are intended solely for explanatory purposes and not in limitation. First, a customer may wish to acquire (e.g., purchase or lease) a vehicle. To get a sense of what types of vehicles are available and what the customer can afford, the customer may wish to access an inventory host website (e.g., hosted by the offer package system 110). The customer may already have some idea of what vehicle he/she wishes to purchase and may select either (i) specific vehicles (e.g., by a VIN) or (ii) a vehicle type(s). In response, the offer package system 110 may receive, from the customer device 120, an initial interest request. The initial interest request may include customer identification information (e.g., a full name, date of birth, social security number, etc.), customer financial information (e.g., income, debt information, etc.), and information associated with at least one vehicle contained within an inventory listing presented on the website.

The offer package system 110 may provide the customer with a personalized list of vehicles based on the information received in the initial request. Once the customer makes a selection of a vehicle of interest, the offer package system 110 may determine a proposed offer package. The determination may be made based on reviewing historical transaction data for similar vehicles, for vehicles sold at the same dealership, and for other factors that can be captured in automotive transaction data. The proposed offer package includes a suggested overall price with suggested options and/or tactics. The offer package system 110 may then provide the proposed offer to the customer. For example, the proposed offer may be delivered through email or may be provided to the customer via a website interface.

As another example, a customer may wish to acquire (e.g., purchase or lease) a vehicle. To get a sense of what types of vehicles are available and what the customer can afford, the customer may wish to access an inventory host website (e.g., hosted by the offer package system 110) and as a result may submit an initial interest request. After receiving the request, offer package system 110 may aggregate vehicle and pricing data from dealership systems 140 as well as data from third party service providers that provide automotive services (e.g., warranty providers, aftermarket accessory providers, service contract providers, etc.). When determining the proposed offer package, offer package system 110 may use the aggregated data in combination with historical transaction data in order to develop the proposed offer package. The proposed offer package may indicate certain suggested options and tactics in order to get the best deal from an individual dealership. The proposed offer package may also indicate that certain suggested options should be purchased from different entities in order to attain the best value. In order to provide a customer with the best value in their vehicle transaction, the proposed offer package may suggest that the customer interact with different entities in order. For example, the proposed offer package may indicate a lower overall price to offer a dealership (e.g., $22,000 for the new Ford Escape), and suggest that the warranty and service contracts be purchased from a third party as opposed to from the dealership. The offer package system 110 may then provide the proposed offer to the customer. For example, the proposed offer may be delivered through email or may be provided to the customer via a website interface.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle system comprising:
   one or more processors; and
   at least one memory in communication with the one or more processors and storing instructions that, when executed by the one or more processors, are configured to cause the system to:
   receive customer financial information associated with a user;
   receive a request from the user, the request comprising vehicle identification information comprising an indication of one or more vehicle features desired by the user;
   identify information associated with one or more vehicles associated with one or more of a plurality of dealership systems;
   generate, based on the vehicle identification information, a filtered set of vehicles from among the one or more vehicles;
   provide, to the user, data representing information associated with the filtered set of vehicles;
   determine a suggested geographic location for purchasing a vehicle of interest;
   generate, based on the request and the customer financial information, a proposed offer package for each vehicle of the filtered set of vehicles, each proposed offer package comprising an associated overall price and the suggested geographic location;
   determine, for each proposed offer package, a first respective likelihood of success metric representing a first likelihood that the proposed offer package will be accepted by the corresponding dealership system based on the customer financial information; and
   provide, to the user, the generated proposed offer packages and the first respective likelihood of success metric.

2. The system of claim 1, wherein the instructions are further configured to cause the system to:
   access historical vehicle purchase transaction data for the corresponding dealership system of each vehicle of the filtered set of vehicles, the historical vehicle purchase transaction data comprising first vehicle information and a first overall negotiated price; and
   determine, for the corresponding dealership system of each vehicle of the filtered set of vehicles and based on one or more preferred user financing preferences, one or more potential addons, the one or more potential addons comprising one or more of a warranty option, a maintenance option, a service contract option, or combinations thereof.

3. The system of claim 2, wherein generating a proposed offer package comprises:
   tracking historical vehicle purchase transaction data for vehicles sold by one or more dealerships associated with the plurality of dealership systems, the historical vehicle purchase transaction data comprising second vehicle information, a second overall negotiated price, and one or more included options; and
   determining, using machine learning and based on the tracked historical vehicle purchase transaction data, the proposed offer package.

4. The system of claim 2, wherein the instructions are further configured to cause the system to:
   receive, from the user, a customer-input indication of acceptance of the determined proposed offer package, and
   responsive to the acceptance, provide, to the corresponding dealership system, data indicating a user's willingness to enter into a transaction based on the proposed offer package.

5. The system of claim 2, wherein:
   each vehicle of the filtered set of vehicles has an associated vehicle type, and
   generating the proposed offer package further comprises:
      tracking historical vehicle purchase transaction data associated with one or more of an overall price, a warranty cost, a maintenance cost, and a service contract cost for the associated vehicle type, and
      determining a suggested time window to provide the proposed offer package for each of the filtered vehicles based on the historical vehicle purchase transaction data.

6. The system of claim 5, wherein the instructions are further configured to cause the system to:
   generate, based on the request and the historical vehicle purchase transaction data, a second proposed offer package for each vehicle of the filtered set of vehicles, each second proposed offer package comprising an associated overall price including one or more addons of one or more potential addons and a monthly payment price within a threshold of a desired monthly payment or within a desired monthly payment range;
   determine, for each second proposed offer package, a respective second likelihood of success metric representing a second likelihood that the second proposed offer package will be accepted by the corresponding dealership system; and
   provide, to the user, via an interface of the vehicle system, the generated second proposed offer package and the respective second likelihood of success metric.

7. The system of claim 6, wherein the second likelihood of success metric is less than the first likelihood of success metric.

8. The system of claim 2, wherein the generated proposed offer package further comprises a suggested tactic.

9. The system of claim 1, wherein the instructions are further configured to cause the system to:
   transmit, to the user, a financial risk questionnaire; and
   receive, from the user, a response to the financial risk questionnaire,
   wherein the proposed offer package for each vehicle of the filtered set of vehicles is generated based on (i) the request, (ii) the response to the financial risk questionnaire, and (ii) the customer financial information.

10. A method comprising:

receiving, via an interface of a vehicle system, a request associated with a user, the request comprising vehicle identification information of one or more vehicles;

identifying dealership information associated with one or more of the vehicles;

accessing historical vehicle purchase transaction data for the corresponding dealership, the historical vehicle purchase transaction data comprising vehicle information and overall negotiated price;

determining a suggested time window to purchase a vehicle type based on the historical vehicle purchase transaction data;

generating, based on the request and the historical vehicle purchase transaction data, a proposed offer package for the one or more vehicles, each proposed offer package comprising the suggested time window and an associated overall price including one or more addons of one or more potential addons and a payment price within a threshold of a desired monthly payment or overall purchase price;

determining, for each proposed offer package, a first respective likelihood of success metric representing a first likelihood that the proposed offer package will be accepted by the corresponding dealership system by comparing the proposed offer package with the historical vehicle purchase transaction data; and providing, to the user, via the interface of the vehicle system, each generated proposed offer package and the first respective likelihood of success metric.

11. The method of claim 10, further comprising:

generating, based on the vehicle identification information, a filtered set of vehicles form among the one or more vehicles; and providing, the user, data representing information associated with the filtered set of vehicles.

12. The method of claim 11, further comprising:

determining, for the corresponding dealership system of each vehicle of the filtered set of vehicles and based on a preferred user financing preferences, one or more potential addons, the one or more potential addons comprising one or more of a warranty option, a maintenance option, a service contract option, or combinations thereof.

13. The method of claim 11, further comprising:

generating, based on the request and the historical vehicle purchase transaction data, a second proposed offer package for each filtered vehicle of the filtered set of vehicles, the second proposed offer package comprising an associated overall price including one or more addons of the one or more potential addons and a monthly payment price within a threshold of the desired monthly payment or within a desired monthly payment range;

determining, for the second proposed offer package, a respective second likelihood of success metric representing a second likelihood that the second proposed offer package will be accepted by the corresponding dealership system; and providing, to the user, via the interface of the vehicle system, the generated second proposed offer package and the respective second likelihood of success metric.

14. The method of claim 13, wherein generating the proposed offer package comprises:

tracking historical vehicle purchase transaction data for vehicles sold by one or more dealerships associated with one or more dealership systems, the historical vehicle purchase transaction data comprising vehicle information, overall negotiated price, and included options; and determining, using machine learning and based on the tracked historical vehicle purchase transaction data, the proposed offer package.

15. The method of claim 14, further comprising:

providing, to the corresponding dealership system, one or more of a suggested new warranty option, maintenance option, service contract option, or combinations thereof based on the tracked historical vehicle purchase transaction data.

16. The method of claim 13, further comprising:

receiving, from the user, a customer-input indication of acceptance of the second proposed offer package; and responsive to the acceptance, providing, to the corresponding dealership system, data indicating the user's willingness to enter into a transaction based on the second proposed offer package.

17. A vehicle system comprising:

one or more processors; and at least one memory in communication with the one or more processors and storing instructions that, when executed by the one or more processors, are configured to cause the system to:

receive, via an interface of a vehicle system, a request associated with a user, the request comprising vehicle identification information comprising an indication of one or more vehicles;

identify dealership information associated with one or more of the vehicles;

access historical vehicle purchase transaction data for the corresponding dealership, the historical vehicle purchase transaction data comprising vehicle information and overall negotiated price;

determine a suggested geographic location for purchasing a vehicle of interest based on the historical vehicle purchase transaction data;

generate, based on the request and the historical vehicle purchase transaction data, a proposed offer package for the one or more vehicles within the suggested geographic location, each proposed offer package comprising an associated overall price including one or more addons of one or more potential addons and a payment price within a threshold of a desired monthly payment or overall purchase price;

determine, for each proposed offer package, a first respective likelihood of success metric representing a likelihood that the proposed offer package will be accepted by the corresponding dealership system by comparing the proposed offer package with historical vehicle purchase transaction data; and provide, to the user, via the interface of the vehicle system, each generated proposed offer package and the first respective likelihood of success metric.

18. The system of claim 17, wherein the instructions are further configured to cause the system to:

generate a filtered set of vehicles from among the one or more vehicles, wherein each vehicle of the filtered set of vehicles has an associated vehicle type, wherein generating the proposed offer packages further comprises at least one of:

tracking historical vehicle purchase transaction data of at least an overall price, warranty cost, maintenance cost, and service contract cost for the associated vehicle type and determining a suggested time window to provide the proposed offer package for each of the filtered vehicles based on the historical vehicle purchase transaction data, and tracking historical vehicle purchase transaction data for vehicles sold by one or more dealerships associated with one or more dealership systems, the historical vehicle purchase transaction data comprising vehicle information, overall negotiated price, and included options, and determining, using machine learning and based on the tracked historical vehicle purchase transaction data, the proposed offer package.

19. The system of claim 17, wherein each of the proposed offer packages is further generated based on customer financial information comprising one or more of credit history, loan history, employment information, or combinations thereof.

20. The system of claim 17, wherein the instructions are further configured to cause the system to:

provide, to the user, a recommendation based on the suggested geographic location; and receive, from the user, an acceptance of the recommendation, wherein the proposed offer package for the one or more vehicles is generated in response to receiving the acceptance of the recommendation.

* * * * *